US009555710B2

(12) United States Patent
Berenbaum et al.

(10) Patent No.: US 9,555,710 B2
(45) Date of Patent: Jan. 31, 2017

(54) DEEP FILTERING OF HEALTH AND USAGE MANAGEMENT SYSTEM (HUMS) DATA

(71) Applicant: Simmonds Precision Products, Inc., Vergennes, VT (US)

(72) Inventors: Arthur Berenbaum, Addison, VT (US); Jessica L. Bergeron, Vergennes, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 14/742,966

(22) Filed: Jun. 18, 2015

(65) Prior Publication Data
US 2016/0368378 A1 Dec. 22, 2016

(51) Int. Cl.
*B60K 35/00* (2006.01)
*H04L 29/08* (2006.01)

(52) U.S. Cl.
CPC ............... *B60K 35/00* (2013.01); *H04L 67/12* (2013.01); *B60K 2350/1004* (2013.01)

(58) Field of Classification Search
CPC .. B60K 35/00; B60K 2350/1004; H04L 67/12
USPC .......................................................... 701/36
See application file for complete search history.

(56) References Cited

U.S. PATENT DOCUMENTS

| | | | |
|---|---|---|---|
| 6,463,431 B1 | 10/2002 | Schmitt | |
| 6,907,416 B2 | 6/2005 | Tasooji et al. | |
| 7,984,146 B2 | 7/2011 | Rozak et al. | |
| 8,868,284 B2* | 10/2014 | Isom | G06Q 10/06311 701/31.4 |
| 2007/0260726 A1* | 11/2007 | Rozak | G06Q 10/06 709/224 |
| 2012/0089626 A1 | 4/2012 | Goranson | |
| 2012/0197911 A1 | 8/2012 | Banka et al. | |
| 2014/0149436 A1 | 5/2014 | Bahrami et al. | |

FOREIGN PATENT DOCUMENTS

AU 2014101081 10/2014

OTHER PUBLICATIONS

European Search Report for European Patent No. 16175123 completed Nov. 10, 2016.

* cited by examiner

*Primary Examiner* — Brian P Sweeney
(74) *Attorney, Agent, or Firm* — Carlson, Gaskey & Olds, P.C.

(57) ABSTRACT

A system for filtering data according to an exemplary aspect of the present disclosure includes, among other things, a data module configured to access vehicle data in a database according to a query input, a display module configured to display the vehicle data in an environment, and a query module configured to generate the query input according to an interactive list of filter statements. Each filter statement in the interactive list of filter statements is selectable from a group of filter types. The group of filter types is configured to dynamically update in response to at least one selection from the group of filter types. A method of filtering data is also disclosed.

23 Claims, 9 Drawing Sheets

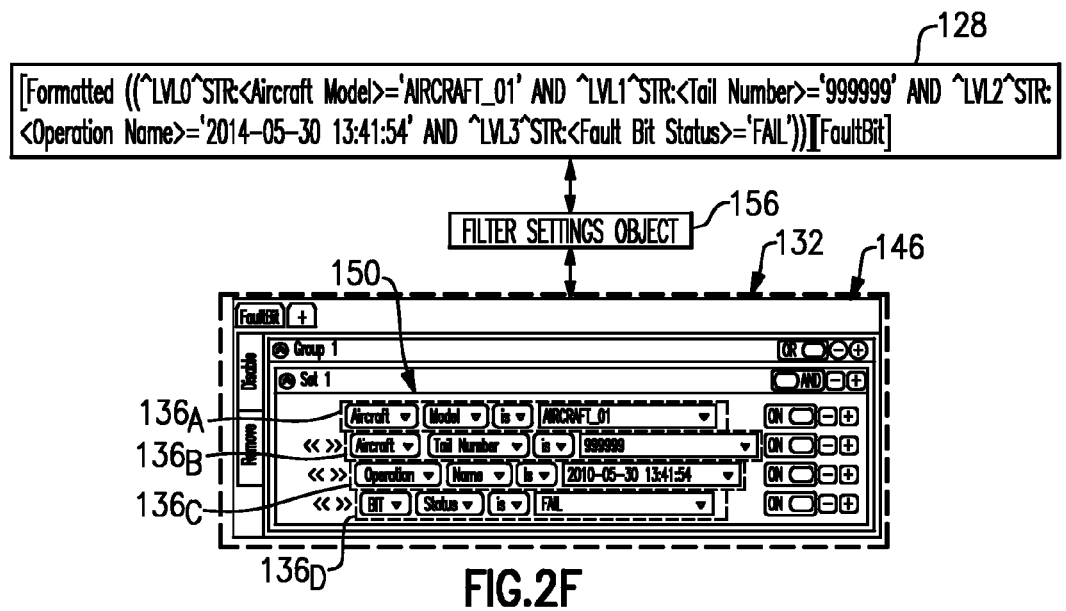
FIG.2F
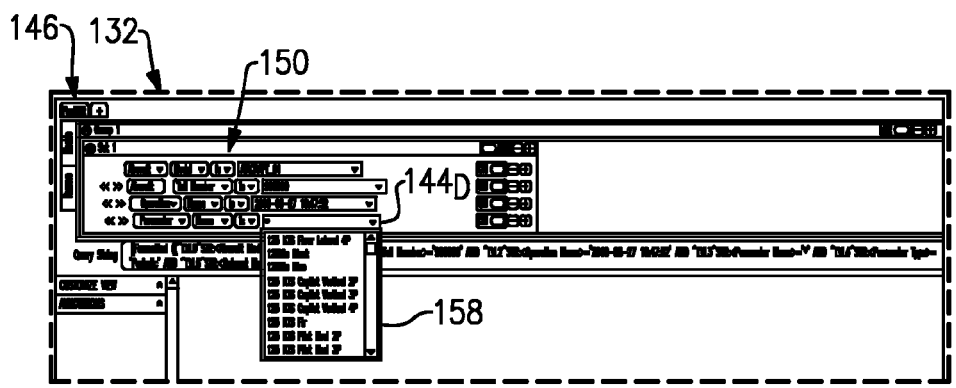
FIG.2D
FIG.2E

DEEP FILTERING OF HEALTH AND USAGE MANAGEMENT SYSTEM (HUMS) DATA

BACKGROUND

This disclosure relates to data filtering, and more particularly, to filtering health and usage management system (HUMS) data in a computing environment.

Some vehicles, such as military and commercial aircraft, can be equipped with various sensors to measure conditions of various sub-systems of the aircraft during operation. Significant amounts of HUMS data can be generated from the sensors during operation of the aircraft. The data generated from the sensors may be stored onboard the aircraft and archived in one or more data locations for later retrieval.

Personnel may desire to view the archived data in one or more HUMS tools or utilities. For example, maintenance personnel may desire to view data collected from the sensors for diagnostics and troubleshooting activities. Other personnel, such as engineering and test personnel or fleet management staff, may desire to view the data collected from the sensors to determine various performance characteristics of the aircraft for development or logistics purposes.

SUMMARY

A system for filtering data according to an example of the present disclosure includes a data module configured to access vehicle data in a database according to a query input, a display module operatively coupled to the data module and configured to display the vehicle data in an environment, and a query module operatively coupled to the data module and to the display module. The query module is configured to generate the query input according to an interactive list of filter statements. Each filter statement in the interactive list of filter statements is selectable from a group of filter types. The group of filter types is configured to dynamically update in response to at least one selection from the group of filter types.

The term "module" refers to software, hardware, or a combination of software and hardware configured to provide a set of distinct functions. The term "operatively coupled" refers to two or more components linked together by software, hardware, or a combination of software and hardware such that the two or more components are able to communicate.

A system for filtering HUMS data according to an example of the present disclosure includes a database configured to store vehicle data communicated from at least one control station, and at least one client computing device including a processor and a memory storage device, the processor being configured to execute an environment. The environment has a query module operatively coupled to a data module and to a display module. The data module is configured to access the vehicle data in the database according to a query input. The display module is configured to display the vehicle data in the environment. The query module is configured to generate the query input according to an interactive list of filter statements, each filter statement in the interactive list of filter statements being selectable from a group of filter types, and the group of filter types being configured to dynamically update in response to at least one selection in the interactive list of filter statements.

A method for filtering HUMS data according to an example of the present disclosure includes setting one or more parameters in an interactive list of filter statements, each filter statement in the interactive list of filter statements selectable from a group of filter types, dynamically updating the group of filter types in response to at least one previous selection from the group of filter types, generating a query input according to the interactive list of filter statements, and accessing vehicle data in a database according to the query input.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 2D illustrates an interaction with the GUI of FIG. 2A displaying a hint list.

FIG. 2E illustrates a sample hint filter string.

FIG. 2F illustrates an interaction between a sample query input and the GUI of FIG. 2A.

DETAILED DESCRIPTION

Figure 1A:
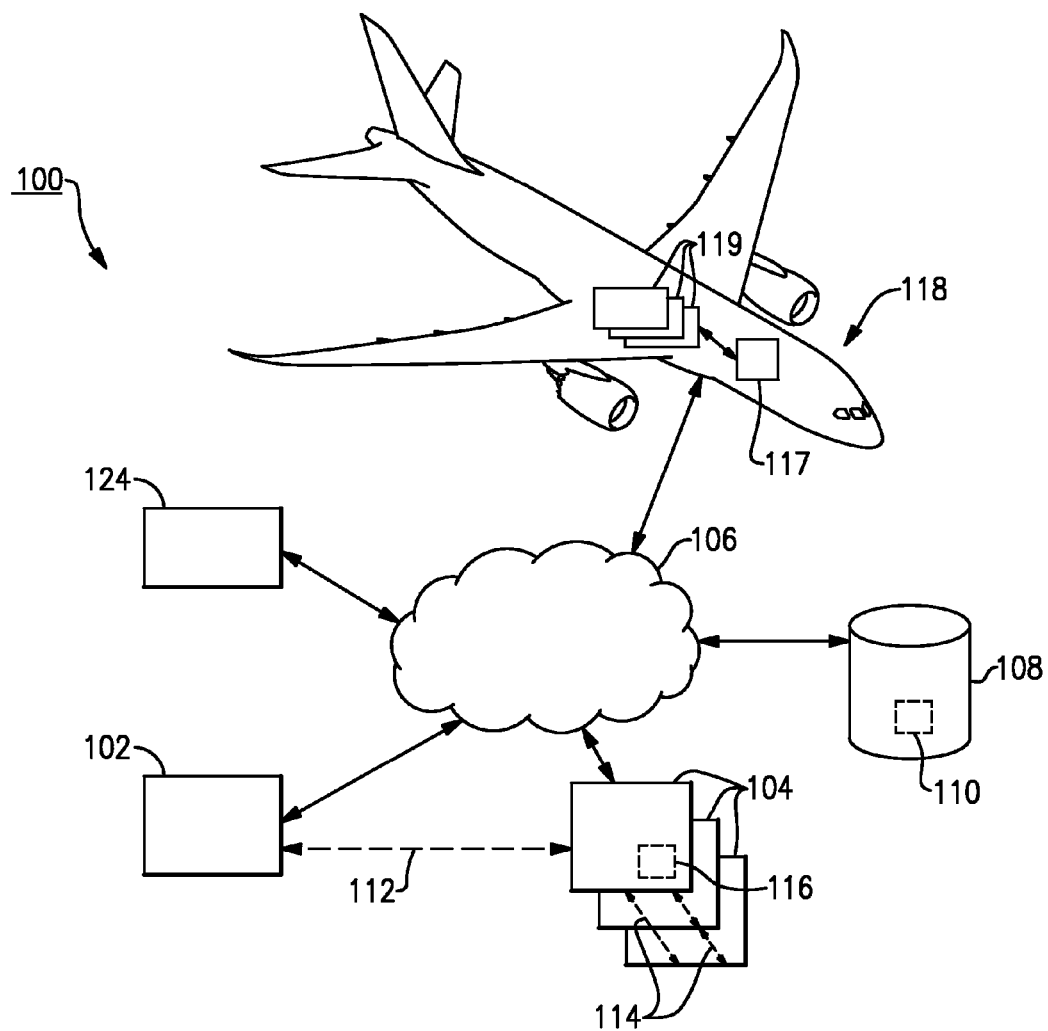
FIG. 1A illustrates a filtering system for a HUMS environment, according to an embodiment.

FIG. 1A illustrates an example computing architecture or system 100 for executing a health and usage monitoring system (HUMS) environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one example, the host computer 102 is more than one computer jointly configured to process software instructions serially or in parallel.

In some examples, the host computer 102 is in communication with one or more networks such as a network 106 comprised of one or more computing devices. The network 106 may be a private local area network (LAN), a private wide area network (WAN), the Internet, a mesh network, or any other network as is known in the art. The system 100 additionally includes one or more client computers 104. The host computer 102 and the one or more client computers 104 typically include one or more of a computer processor, memory, storage means, network device and input and/or output devices and/or interfaces according to some examples. The memory may, for example, include UVPROM, EEPROM, FLASH, RAM, ROM, DVD, CD, a hard drive, or other computer readable medium which may store data and/or the HUMS filtering software of this description.

The host computer 102 and the one or more client computers 104 may be a desktop computer, laptop computer, smart phone, tablet, or any other computer device. In some examples, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some examples, each of the client computers 104 is a user workstation capable of accessing and locally running HUMS software and providing an environment 116. The environment 116 can be operable to perform one or more HUMS filtering and reporting functions, for example. In other examples, at least one of the client computers 104 is operable to execute different HUMS filtering and reporting functions. The environment 116 can be configured to provide a display or visualization of vehicle data, and can be provided via a graphical user interface (GUI), as discussed in detail below.

In some examples, the one or more client computers 104 are configured to communicate with the host computer 102 directly via a direct client interface 112 or over the network 106. The one or more client computers 104 are configured to execute one or more software programs, such as a HUMS package or utility. The HUMS package can be configured to communicate with the host computer 102 either over the network 106 or directly through the direct client interface 112. In another example, the one or more client computers 104 are configured to communicate with each other directly via a peer-to-peer interface 114. In one example, the host computer 102 and one or more of the client computers 104 are the same physical computing device. In another example, host computer 102 and one or more of the client computers 104 are emulated as different instances of a virtual machine (VM), for example.

The system 100 additionally includes a storage system 108, which in some examples is operable to store or otherwise provide data to other computing devices. In one example, the storage system 108 is a storage area network device (SAN) configured to communicate with the host computer 102 and/or the one or more client computers 104 over the network 106. In another example, the storage system 108 is located within the host computer 102 or within at least one of the client computers 104. The storage system 108 may be configured to store one or more of computer software instructions, data, HUMS files, database files, configuration information, etc., depending on the needs of a particular situation.

In some examples, the system 100 is a client-server architecture configured to execute computer software on the host computer 102, which is accessible by the one or more client computers 104 using either a thin client application or a web browser executing on the one or more client computers 104. In some examples, the host computer 102 loads the computer software instructions from local storage, or from the storage system 108, into memory and executes the computer software using the one or more computer processors.

In some examples of the HUMS system 100, vehicle data is stored within one or more databases 110 at a central location, such as storage system 108, the database 110, host computer 102, or another location in the network 106. In another example, the database 110 is a distributed database provided by one or more of the client computers 104. The database 110 is configured to store data from one or more systems, such as at least one vehicle 118. Although vehicle 118 is described in the context of a fixed wing aircraft, the database 110 can store data from other vehicles such as rotary aircraft, ground-based systems, marine systems, and from other manned and unmanned systems generating, collecting, storing, or otherwise communicating HUMS data.

In the illustrated example of FIG. 1A, the vehicle 118 includes at least one collection system 117 for collecting HUMS data from the vehicle 118. The collection system 117 can be coupled to one or more sensors 119 configured to detect conditions of various subsystems of the vehicle 118 for performance monitoring, diagnostics, and the like. Example subsystems can include engines and controls, communications and electronics, environment control systems (ECS), fuel and lubrication systems, electrical power generation equipment, accessories, and the like. In some examples, one or more control stations 124 are configured to communicate vehicle data between the vehicle 118 and the database 110. In other examples, the vehicle 118 stores vehicle data directly to the database 110 via the network 106.

Figure 1B:
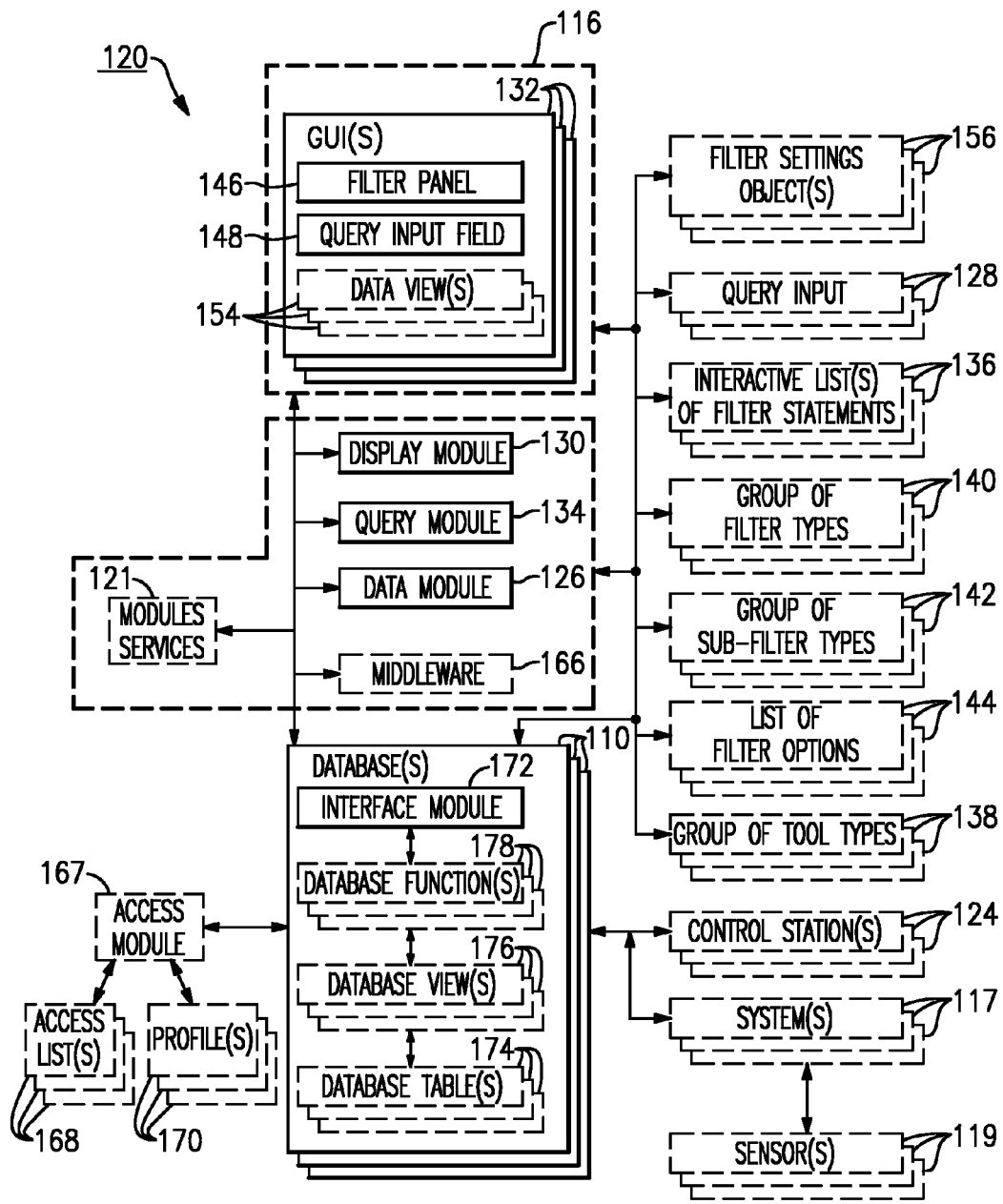
FIG. 1B schematically illustrates a filtering package, according to an embodiment.

FIG. 1B illustrates a filter package 120 for filtering data in an environment 116, such as for filtering HUMS data in system 100, according to an example. The filter package 120 is configured to generate one or more database queries based on one or more interactive and dynamic lists, thereby providing additional flexibility to users desiring to access various data. In some examples, the filter package 120 is provided as a portion of a HUMS tool or application. In other examples, the filter package 120 is a standalone software program and is configured to interface with a HUMS software tool to provide the desired solution. In one example, the filter package 120 is provided by a tangible or non-transitory computer-readable storage medium and installed at one or more of the client computers 104, the host computer 102, and/or the control station 124 of FIG. 1A.

The filter package 120 includes one or more modules operable to filter, access and/or display data, such as vehicle data communicated from one or more sensors 119. Each of these modules includes executable software instructions and/or digital or analog hardware circuitry. The filter package 120 is, in one example, configured to interact with one or more services or modules 121 having functionality to provide the desired solution. In one example, the various modules 121 are stored in one or more software libraries as one or more data classes which can be instantiated by the environment 116. The modules 121 are accessible directly by the environment 116, by interacting with a middleware 166 or host computer 102, or can be accessed by the database 110, for example. In one example, the middleware 166 is programmed in the environment 116, at the host computer 102, or one of the client computers 104.

The filter package 120 includes a data module 126 operatively coupled to the database 110. The data module 126 is configured to access vehicle data in the database 110 by querying the database 110 according to at least one query input 128 in a desired data format.

The filter package 120 includes a display module 130 operatively coupled to the data module 126. In the illustrated example of FIG. 1B, the display module 130 is configured to generate one or more graphical user interfaces (GUI) 132. The GUIs 132 include functionality to access vehicle data in the database 110 by indicating a desired query input 128, as discussed in detail below. In some examples, the GUIs 132 include functionality to report or present the data in a desired format or data view 154, such as one or more grids, graphs and other visual formats.

Figure 2A:
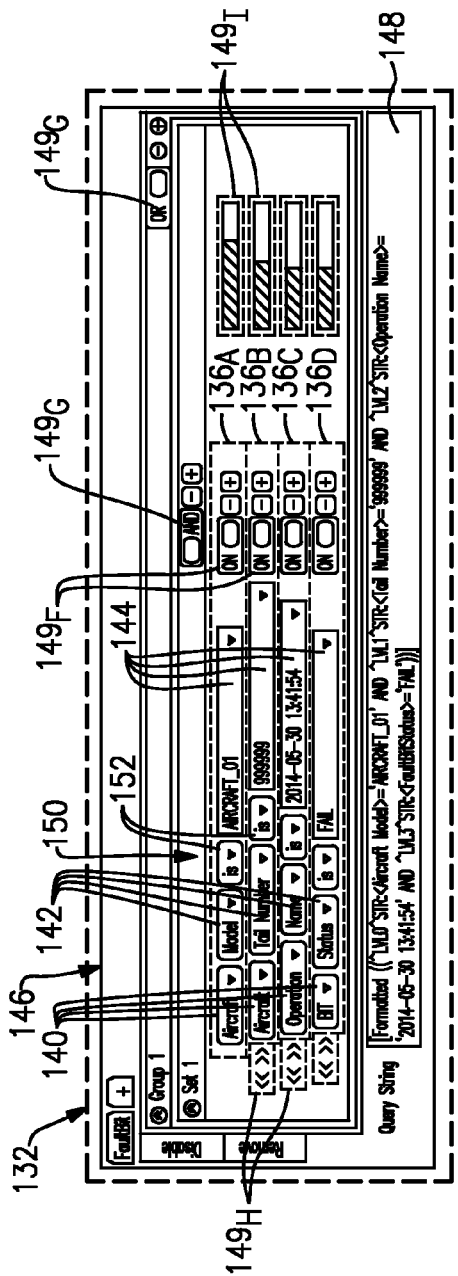
FIG. 2A illustrates selected portions of an example graphical user interface (GUI).
Figure 3:
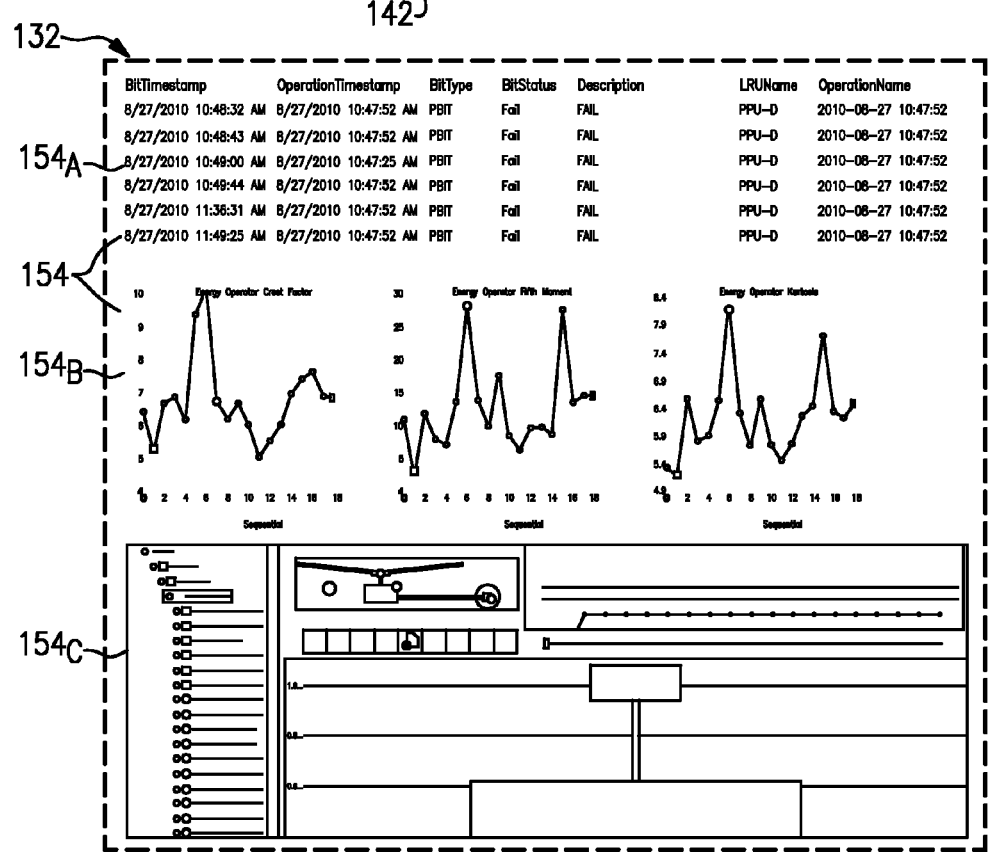
FIG. 3 illustrates sample reports for the filtering package of FIG. 2.

FIG. 3 illustrates one or more reports or data views 154 in GUI 132. The data views 154 can include one or more tables 154A, charts 154B or interactive graphics 154C, for example. The interactive graphic 154C can be configured to depict vehicle data, for example, in a desired format and according to at least one interactive list of filter statements 136 indicated in the query input 128 as discussed in detail below. Utilizing the techniques discussed herein, the reporting or presenting of vehicle data in the GUI 132 or environment 116 is not constrained to a specific hierarchy or predefined structure. In the illustrated example of FIG. 3, the GUI 132 presents data from the database 110 according to one or more values in the query input 128 that a user specifies in a filter panel 146 (FIG. 2A), as discussed in detail below.

The filter package 120 includes a query module 134 operatively coupled to the data module 126 and to the display module 130. The query module 134 is configured to generate query input 128 in a desired format and according to at least one interactive list of filter statements 136. The query module 134 is configured to cause the data module 126 to query the database 110 according to the query input 128. The interactive list of filter statements 136 provides a tailorable and scalable technique for accessing data in the database 110, such as vehicle or HUMS data, as discussed below.

The display module 130 is configured to generate one or more GUIs 132. The GUIs 132 are operable to permit a user to select or otherwise indicate one or more desired parameter(s) in the interactive list of filter statements 136. The GUIs 132 are operable to cause the interactive list of filter statements 136 to update in response to a user interaction.

Referring to FIG. 2A with continued reference to FIG. 1B, an exemplary GUI 132 for accessing data in the database 110 is shown. The GUI 132 includes a filter panel 146 and a query input field 148. The filter panel 146 presents at least one graphical representation 150 corresponding to one or more of the interactive lists of filter statements 136. In the illustrated example of FIG. 2A, the representation 150 includes four filter statements 136A-136D in a nested or hierarchal list.

The interactive list of filter statements 136 may be selected according to one or more groups of tool types 138. The tool type(s) 138 can be determined based on the particular tool(s) or application(s) executing the filter package 120 in the environment 116, for example. Example tools or applications include mechanical diagnostics tools, fleet management tools, presentation tools, and the like. Other example tools or applications include built-in test, events, exceedances, flight parameter trends (e.g. airspeed, torque, etc.), usage/logbook (i.e., time or count attributed to parts), rotor vibration, rotor track, rotor tuning, flight parameter histograms, maintenance actions, parts watch list, power assurance (i.e., engine diagnostics), root cause analysis, software versions, etc. Accordingly, selections in some types of filter statements may be available for certain tool types 138, but not other tool types 138, depending on the capabilities of the particular tool or application.

Parameter(s) in the interactive list of filter statements 136 are selectable by a user interaction of a user or system desiring to access data in the database 110 in a desired way. Each filter statement in the interactive list of filter statements 136 is selectable from a group of filter types 140. In some examples, the filter type(s) in the group of filter types 140 are generated according to the respective tool type 138 of the tool causing the interactive list of filter statements 136 to execute.

Figure 2H:
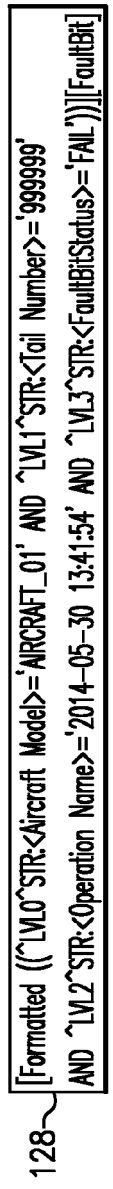
FIG. 2H illustrates a sample query input.
Figure 2G:
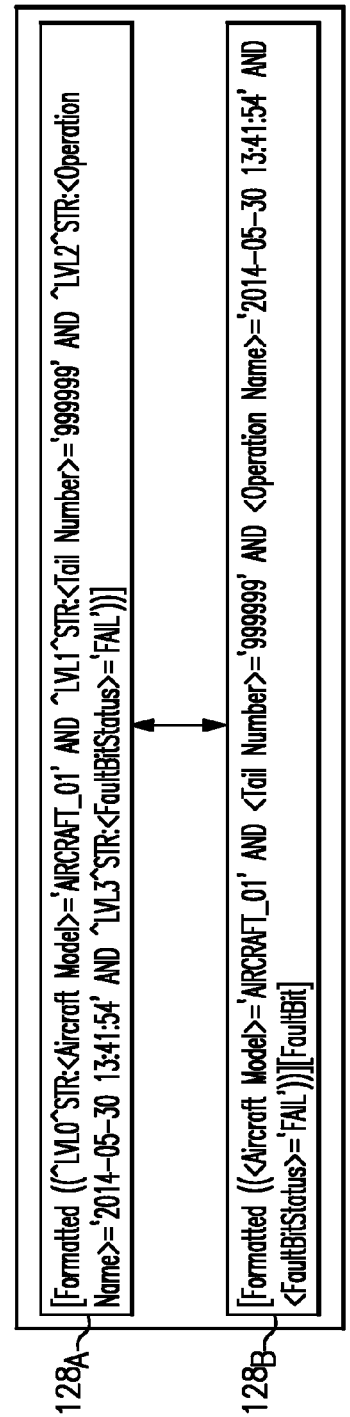
FIG. 2G illustrates a sample query input converted to another data format.
Figure 2B:
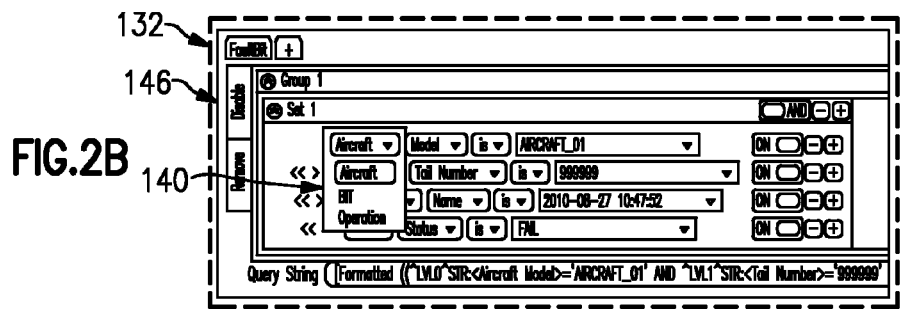
FIG. 2B illustrate a filter interaction with the GUI of FIG. 2A.

The filter types 140 correspond to various types of data stored in the database 110, based on types of vehicle data from the sensors 119 located on the vehicle 118, for example. Example filter types include vehicle or system type, subsystem type, built-in-test (BIT) type, aircraft model type, vendor or original equipment manufacturer (OEM) type, customer type, location type, operational cycle or flight number type, and the like. Other example filter types include aircraft tail number, event name, event timestamp, exceedance name, exceedance timestamp, health indicator name, part name, sensor name, condition indicator value or name, avionics parameter name, indicator type, indicator validity, indicator sensor name, parameter value, indicator acquisition timestamp, operation start timestamp, parameter data set name, parameter type, rotor name, shaft order name, capture window name, user name, version name, etc. In some examples, each category of data in the database 110 corresponds to a filter type 140 selectable in the interactive list of filter statements 136. Each of the filter statements 136A-136D includes a selected filter from the group of filter types 140. An example selection from the group of filter statements 136 for one of the filter statements is shown in FIG. 2B.

In some examples, the query module 134 is configured to cause the database 110 to dynamically update the group of filter types 140 in response to at least one selection from the group of filter types 140. In some instances, the multiple users interacting with the system 100 are associated with different organizational entities, or assigned with different responsibilities, and may have different levels of interest with the data in the database 110, for example. Accordingly, the user is able to select filters in any desired order, or hierarchy, even though the multiple users have access to an instance of the same tool or application accessing the data, for example. The query module 134 is operable to query the database 110 and cause the group of filter types 140 to dynamically update with values based on one or more previous selections made, or parameters set, in the interactive list of filter statements 136, and prior to causing a database query to execute according to the query input 128.

In some examples, the group of filter types 140 is configured to dynamically update based on data present in the database 110 and in response previous selection(s) of filters from the group of filter types 140 and/or other parameters in the interactive list of filter statements 136. Accordingly, the various filter options presented in the filter panel 146 can represent the pool of available data present in the database 110, such as one or more table columns and column relationships, table rows, and/or table fields, thereby reducing the need to generate additional database queries in instances where data corresponding to a desired filter option has not been stored in the database 110 or is otherwise unavailable at the time the parameters of the query input 128 for a database query are set.

Figure 2C:
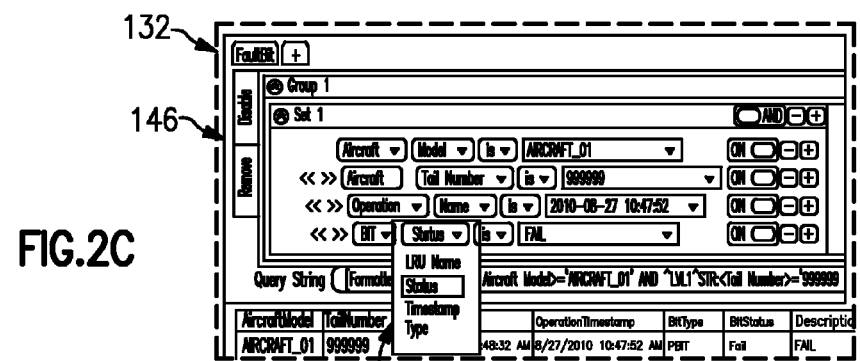
FIG. 2C illustrates a sub-filter interaction with the GUI of FIG. 2A.

In some examples, each filter statement in the interactive list of filter statements 136 is selectable from a group of sub-filter types 142 to further characterize the filter type 140 in the respective filter statement 136. Example sub-filter types include any of the filter types discussed herein. Each of the filter statements 136A-136D includes a selected sub-filter from the group sub-filter types 142. An example selection from the group of sub-filter types 142 for one of the filter statements is shown in FIG. 2C.

In some examples, the query module 134 is configured to cause the database 110 to dynamically update the group of sub-filter types 142 in response to at least one selection from the group of filter types 140. In some examples, the group of sub-filter types 142 is configured to dynamically update based on data present in the database 110. In other examples, the group of sub-filter types 142 is configured to dynamically update in response to previous selection(s) from the group of filter types 140 and/or sub-filter types 142. Accordingly, a user is able to select a sub-filter from the group of sub-filter types 142, while having flexibility in the selection of filters in any desired order or hierarchy. The filtering techniques described herein allow a user to specify filtering parameters or criteria such that most, or every, field of view or dataset in the database 110 is available for filtering and reporting in the environment 116.

Each filter statement 136 includes a filter option from the list of filter options 144. Each filter type in the group of filter types 140 and/or each sub-filter in the group of sub-filter types 142 is linked to a list of filter options 144. The list of filter options 144 is configured to dynamically update in response to selections from the group of filter types 140 and/or the group of sub-filter types 142. In one example, the query module 126 is configured to cause the database 110 to dynamically update the list of filter options 144 to correspond to selected filter type(s) 140 and/or sub-filter type(s) 142 in filter statement(s) 136 having the same or higher level of indenture than the respective filter statement 136.

In further examples, the query module 134 is configured to cause the database 110 to update the list of filter options 144 according to data present in the database 110 and/or according to the selected values of filters 140 and sub-filters 142 in the interactive list of filter statements 136. Utilizing these techniques, the filter package 120 is operable to indicate to a user the available filter types 140 and/or sub-filter types 142 corresponding to data that is present in the database 110. These techniques reduce instances where a user causes a database query to execute for additional filter types 140, sub-filter types 142 and/or filter options 144 that do not have any corresponding data present in the database 110.

Each filter statement 136 in the representation 150 is associated with an operator 152. The operator 152 acts on the list of filter options 144 according to the respective filter and/or sub-filter in the filter statement 136. Example operators 152 include basic mathematical operators, logical operators, and the like. Other example operators include timestamp operators (e.g., earlier than, later than, between, or within a previous number of days, hours and/or minutes), string operators (e.g., contains, in the list of, etc.), and a range of values (having two input fields for options rather than just a single field). In another example, the operators 152 correspond to one or more data types, such as an integer, character, text string, Boolean, date, datetime, decimal (i.e., floating point), or binary. In some examples, the operator 152 includes an option such that a user is able to select multiple filter options from the list of filter options 144, by selecting a desired option from the GUI 132 or utilize wildcards.

Referring to FIG. 2D, in some examples the query module 134 is operable to cause the display module 130 to display in the GUI 132 a list of available values or "hints" for the respective list of filter options 144. Each list of filter options 144 can be linked to a hint list 158, such as filter option 144D. The hint list 158 can be coupled to the database 110 such that values in the list of filter options 144 correspond to data present in the database 110. An example hint filter string 159 corresponding to a hint list 158 having parameters associated with an indicated aircraft model and an indicated tail number is shown in FIG. 2E.

The hint filter string 159 can be utilized to query the database 110 for values in the list of filter options 144. In one example, the query module 134 is configured to communicate the hint filter string 159 to the database 110. The database 110 is configured to dynamically update the hint list 158 with values corresponding to vehicle data or other data that is present in the database 110 at the time that values for the query input 128 are being selected in the filter panel 146.

In the illustrated example of FIG. 2D, a user is able to further restrict the hint filter string 159 of FIG. 2E by indicating one or more parameters or criterion in a text box corresponding to filter option 144D in the filter panel 146, such as a word, phrase and/or wildcard (shown in FIG. 2D as an asterisk "*"), for example, and is presented with values in the corresponding hint list 158 meeting the criterion.

Figure 2J:
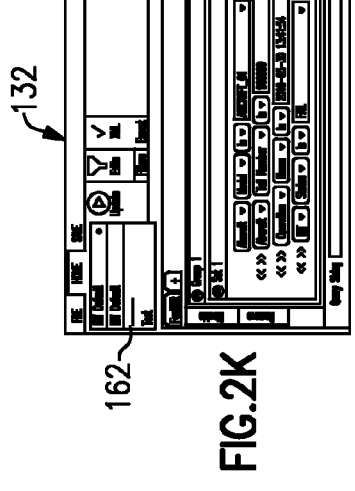
FIG. 2J illustrates a storing interaction with the GUI of FIG. 2A.
Figure 2K:
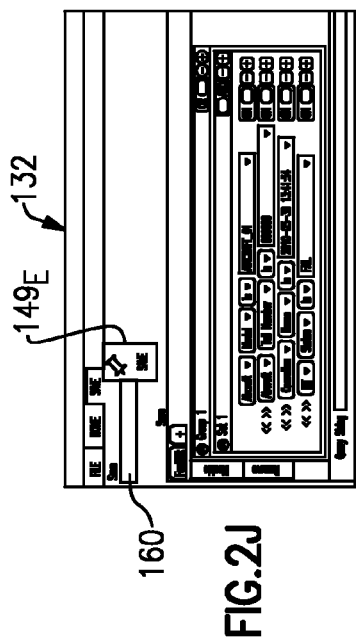
FIG. 2K illustrates a retrieval interaction with the GUI of FIG. 2A.

Each filter statement 136 can be selectively activated or deactivated prior to generating the query input 128 by selecting one or more icons 149F in the filter panel 146, for example. Although, a single representation 150 of a filter set or interactive list of filter statements 136 is shown in FIG. 2A (indicated as "Set 1"), in some examples a user is able to select parameters for two or more interactive lists of filter statements 136 and designate the two or more lists as a group (indicated as "Group 1") to generate a desired single query input 128. In the illustrated example of FIG. 2M, two or more interactive lists of filter statements 136 relating to representations 150A, 150B can be executed according to one or more logic or Boolean parameters specified according to icon 149G.

The representation 150 of the interactive list of filter statements 136 is linked to the query input field 148, which in one example is a text box. The display module 130 is configured to cause the query input field 148 to update in response to user interaction with the filter panel 146 to select desired parameter(s) of the interactive list of filter statements 136. In the illustrated example of FIG. 2A, the GUI 132 is operable to cause the representation 150 of the interactive list of filter statements 136 to repopulate or otherwise update according to the query input field 148. This technique allows a user to quickly change one or more parameters in the query input field 148 causing various parameters in the representation 150 to update. Additionally, presentation of parameters in the interactive list of filter statements 136 in the query input field 148 increases the ability of a user provided with the environment 116 to copy, save, and/or share the interactive list of filter statements 136 with other users of the system 100.

Various techniques for storing the interactive list of filter statements 136 can be utilized. Referring to FIG. 2F, with continued reference to FIGS. 1B and 2A, the filter panel 146 can be operatively coupled to one or more filter settings objects 156. In the illustrated example of FIG. 2F, the query module 134 is operable to convert the interactive list of filter statements 136 between a query string and a filter settings object 156. The filter settings object 156 is linked to a respective representation 150 of the interactive list of filter statements 136. The filter settings object 156 can be an instance of a class or data structure arranged to store parameter(s) of each of the filter statements in the interactive list of filter statements 136, including various parameter(s) supported in the native or local format and/or the global or database format. In one example, the filter settings object 156 is configured to store or cache one or more parameters of the interactive list of filter statements 136 locally in the environment 116, such as the hierarchal levels of each of the filter statements 136A-136D, for example.

The display module 130 is configured to cause the representation 150 and the query input field 148 to update according to the filter settings object 156, and cause corresponding parameters in the filter settings object 156 to update in response to a user interaction with the filter panel 146 and/or the query input field 148. The query module 134 is configured to cause the query input 128 to generate according to the filter settings object 156. In some examples, the display module 130 is configured to display or present data in the GUIs 132 or another portion of the environment 116 according to the filter settings object 156.

In some examples, the query module 134 is operable to cause the data module 126 to query the database 110 according to the query input field 148 in the GUI 132, or parameters in a command prompt. A user is able to specify the desired parameter(s) or values for the query input 128 in a text string (e.g., 128B of FIG. 2G). The query input 128 can be parsed by the query module 134, middleware 166, and/or database 110, for example, prior to executing a database query.

The query module 134 is configured to cause query input 128 to generate in a desired format according to one or more selections made in the filter panel 146. The format of the query input 128 can include level(s) of indenture of the filter statements, as illustrated by filter statements 136A-136D in FIG. 2A and as illustrated by corresponding query input 128 in the form of a text string in FIG. 2H. It should be appreciated that the query input 128 can be utilized for different databases 110 supporting the parameters of the query input 128. In the illustrated example of FIG. 2A, a user is able to indicate a desired level of indenture by selecting an icon 149H corresponding to one of the filter statements.

The query module 134 is configured to cause the data module 126 to re-query the database 110 for available values in the group of filter types 140, sub-filter types 142 and/or list of filter options 144 in response to a change in a level of indenture of the filter statement(s), including any parent filter statement(s) in a respective hierarchy. In some examples, the filter panel 146 includes one or more status or progress bar icons 149I indicating a status of updating values in the group of filter types 140 and sub-filter types 142 for the respective filter statement(s) 136 based on querying the database 110.

The query module 134 is configured to convert parameters of the interactive list of filter statements 136, specified in the query input field 148, between a local or native data format and a common or database data format suitable for the database 110. In some examples, the query module 134 causes the data module 126 to cache data or parameters of the interactive list of filter statements 136 in the local format, but may be unsupported in the database format. The query module 134 is operable to reconstruct the interactive list of filter statements 136 from the database format to the native format utilizing the cached data such that the representation 150 of the interactive list of filter statements 136, or the vehicle data in one or more reports, is presented in the native data format within the environment 116.

In some examples, the query module 134 is operable to parse one or more query strings into query string data or parameters, and is operable to convert the query string data to a desired format. FIG. 2G illustrates an example of converting parameters of the interactive list of filter statements 136 between a local format 128A and a database format 128B. In the illustrated example of FIG. 2G, the query module 134 determines the tool type 138 of the tool that is executing the filter package 120, and embeds the tool type in the database format 128B (indicated as "[Fault Bit]"). The query module 134 is operable to remove the hierarchical details of the interactive list of filter statements 136, as depicted in the representation 150 (FIG. 2A) and the local format 128A (indicated as "^LVL0^STR", "^LVL1^STR", and "^LVL2^STR"), which are unsupported by the database 110. As previously discussed, the query module 134 may cause the hierarchal parameters in the local format 128A to be cached such that the interactive list of filter statements 136 in the local format 128A can be reconstructed from the database format 128B.

Figure 2I:
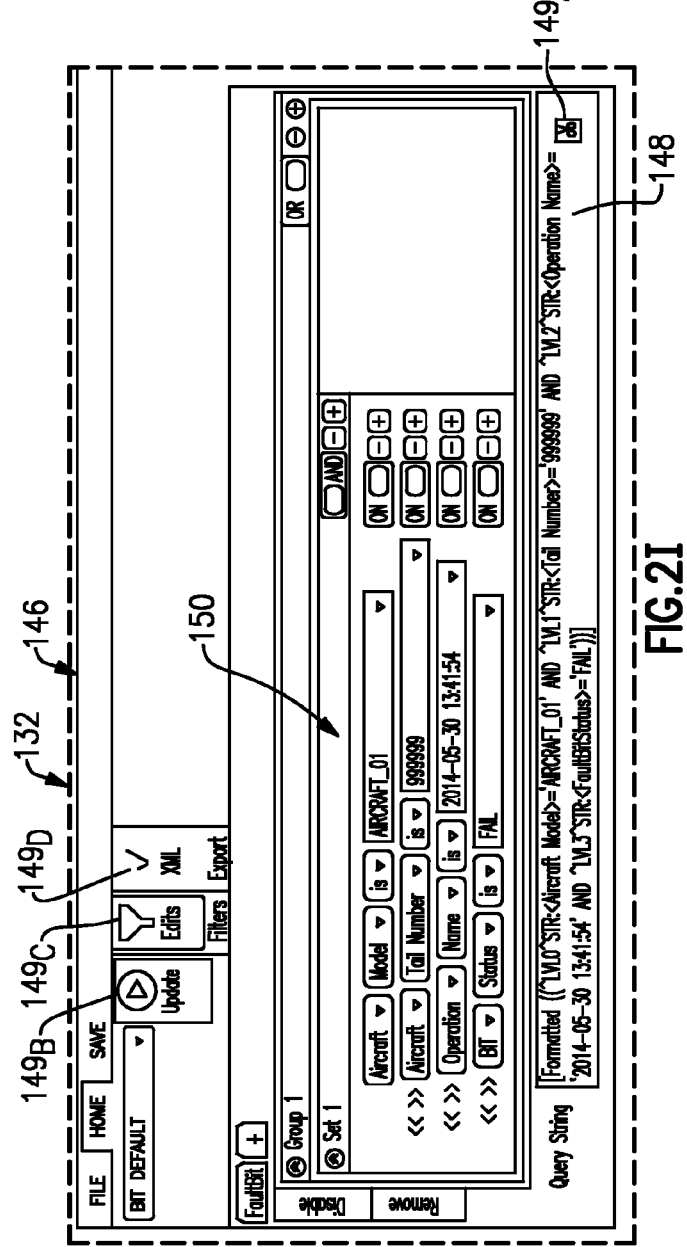
FIG. 2I illustrates a copy and paste interaction with the GUI of FIG. 2A.

Referring to FIG. 2I, with continued reference to FIGS. 1B and 2A, the query module 134 is operable to cause the data module 126 to store, retrieve, and/or share query input 128. The query input 128 can be stored locally, in the database 110, or remotely at another memory location in the network 106. The query input 128 can be shared between different users, tools, applications or environments 116 executing the filter package 120, including different instances of HUMS tools executing in different networks, companies, and/or geographical locations, for example.

In the illustrated example of FIG. 2I, a user is able to interact with the GUI 132 by pasting or cutting a textual representation of the interactive list of filter statements 136 to or from the query input field 148 by selection of an icon 149A, for example. In another example, the user may interact with the GUI 132 to paste a textual representation of the query input 128 in the query input field 148, and select an update icon 149B to cause the representation 150 to update according to the query input field 148. In alternative examples, the user selects the update icon 149B to cause the query input field 148 to update according to the representation 150. In some examples, the user may select an edit icon 149C prior to being able to edit the interactive list of filter statements 136 utilizing the query input field 148 and/or the filter panel 146.

Referring to FIG. 2J, with continued reference to FIGS. 1B and 2A, the GUI 132 can include one or more icons 149E or other features configured to cause the data module 126 to store a copy of the query input 128. The copy of the query input 128 can be stored locally or in the database 110, and in a native format or database format. In the illustrated example of FIG. 2J, a user is able to specify a desired name for the query input 128, such as in a named field 160 of the GUI 132.

In some examples, the query module 134 is operable to cause the data module 126 to export and/or import query input 128 to and from the environment 116 or the database 110. In the illustrated example of FIG. 2K, a user can interact with the GUI 132 to select an export icon 149D to cause the query input 128 to export to another tool, or to a desired location such as a text or XML file, email, or to a desired memory location on the network 106. In another example, a user can interact with the GUI 132 to import an interactive list of filter statements 136 such as from any of the locations discussed herein into the environment 116, and cause the filter panel 146 to reload the representation 150 by selecting an update icon 149B.

Referring to FIG. 2K, with continued reference to FIGS. 1B and 2A, the user is able to interact with the GUI 132 to retrieve or import a saved query input 128 by interacting with a query list 162, for example. The query list 162 indicates the names of various query inputs 128 stored in the database 110 or locally in the environment 116. Accordingly, a user is able to store and retrieve previously created or stored query input 128, share the query input 128 with other users of the system 100, and query new data that has been loaded to the database 110 utilizing the previously stored query input 128.

Figure 2L:
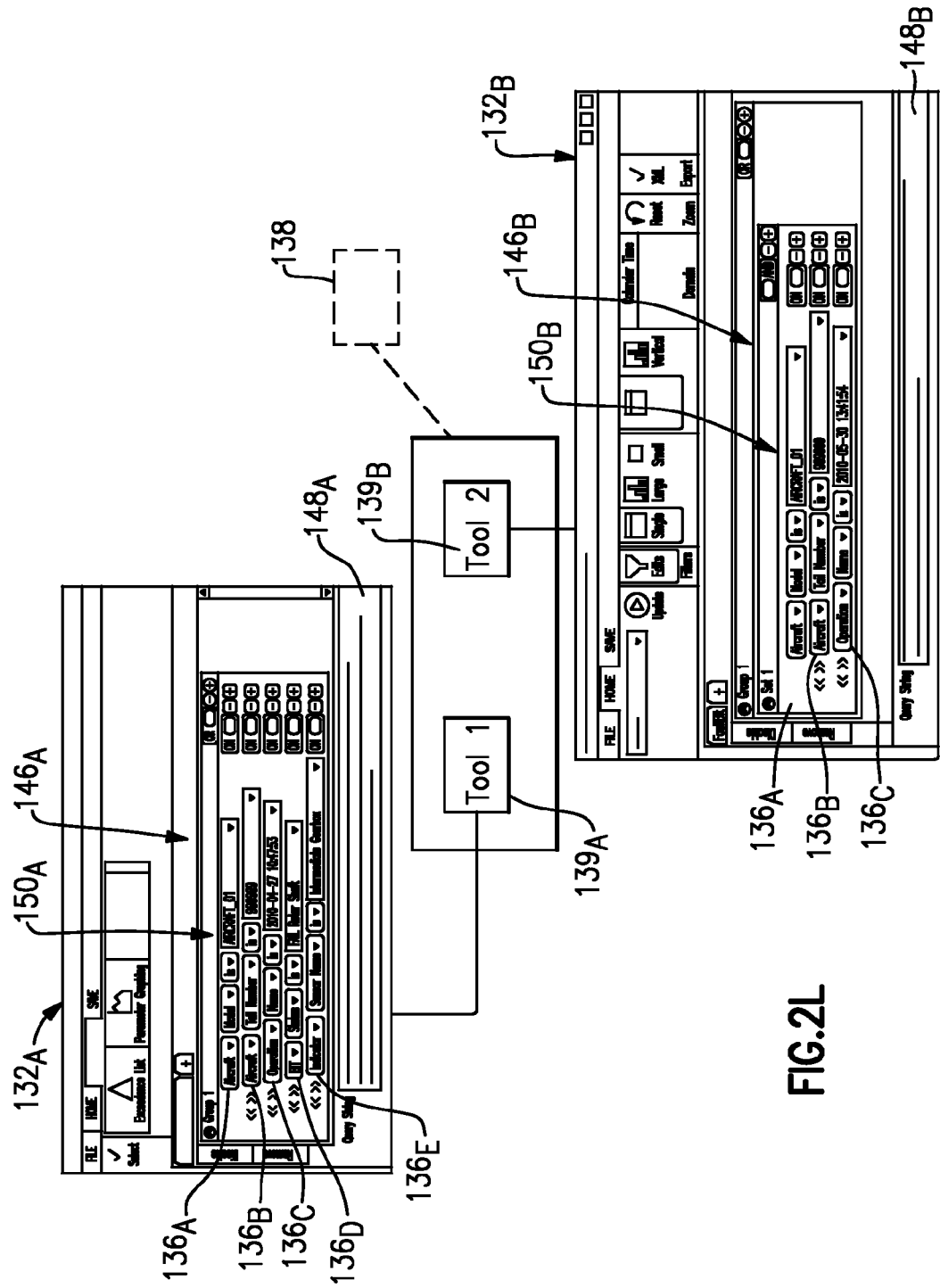
FIG. 2L schematically illustrates an interaction between example GUIs coupled to different filtering tools.
Figure 2M:
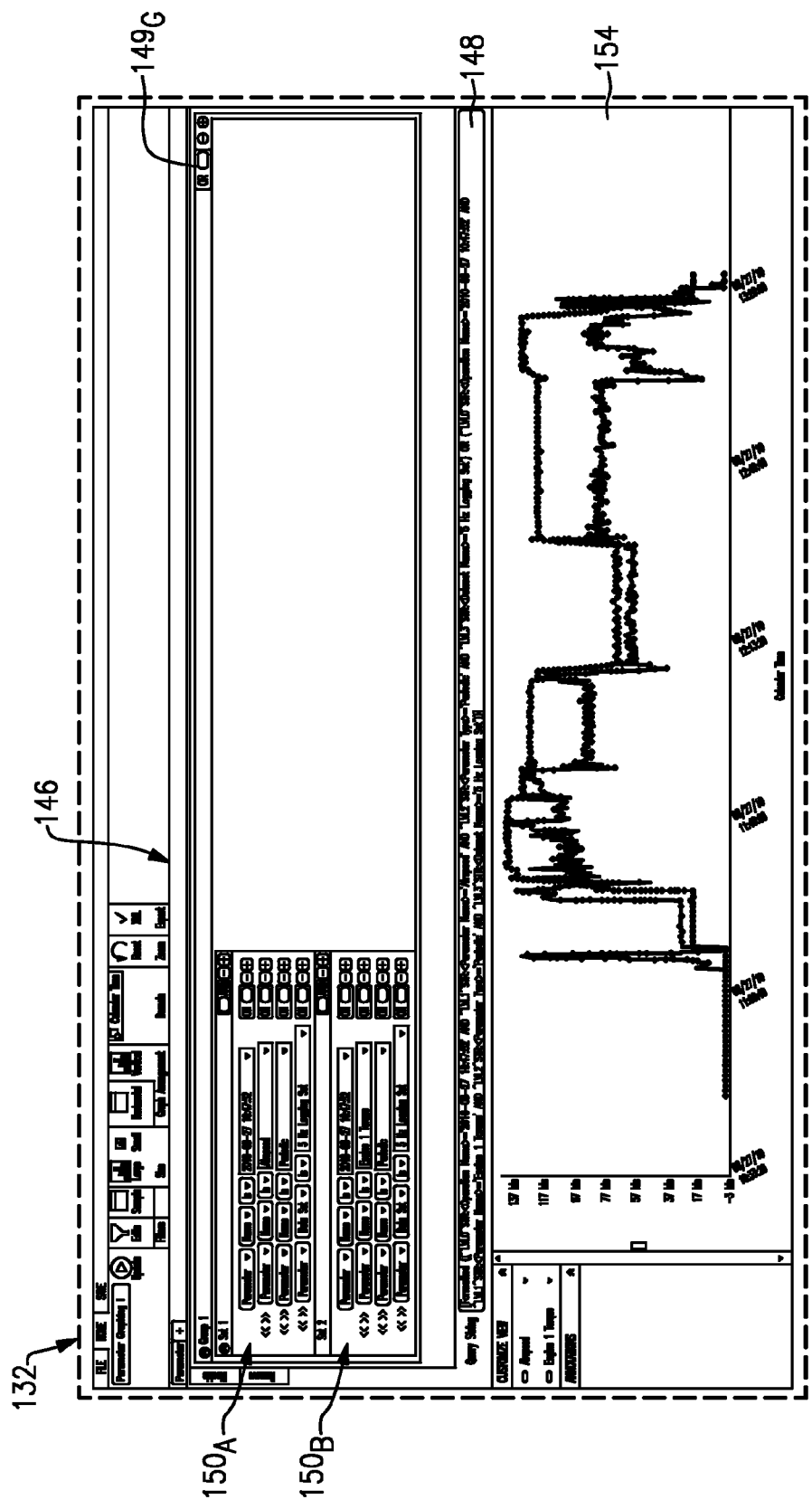
FIG. 2M schematically illustrates an example GUI depicting data relating to two or more interactive lists of filter statements.

Referring to FIG. 2L, with continued reference to FIGS. 1B and 2A, in some examples the query module 134 is operable to maintain a filter context when navigating between two or more different tools in the environment 116. The query module 134 is configured to cause the interactive list of filter statements 136 corresponding to a first tool to update according to commonality with at least one other interactive list of filter statements 136 corresponding to a second, different tool.

In the illustrated example of FIG. 2L, a first tool 139A is a mechanical diagnostics tool associated with GUI 132A, and a second tool 139B is a report generation or data view tool associated with GUI 132B. Each of the tools 139A, 139B can be configured to execute in a single environment 116 or in different environments 116 executing in a single computing environment or separate client computers 104, for example. The representation 150A is shown in this example having five filter statements 136A-136E, and the representation 150B is shown having three filter statements 136A-136C.

The query module 134 is configured to cause the list of filter statements 136 corresponding to representation 150B to update based on a union or commonality with the list of filter statements 136 corresponding to representation 150A. In the illustrated example of FIG. 2L, the query module 134 is operable to cause the list of filter statements corresponding to representation 150B to update based on determining a tool type from the group of tool types 138 for each of the first and second tools 139A, 139B and the corresponding filter types 140 and sub-filter types 142 supported by each of the respective tool types 138.

In the illustrated example of FIG. 2L, tool 139B is operable to present the desired data with fewer than each of the filter statements supported by tool 139A. For example, filter statements 136A-136C are common between the filter panels 146A and 146B. Filter statements 136D and 136E are unsupported by tool 139B, and are therefore excluded from being synchronized in list of filter statements 136 corresponding to representation 150B in the filter panel 146B. It should be appreciated that each representation 150A and 150B corresponds to a different interactive list of filter statements 136 (FIG. 1B).

Various techniques for querying the database 110 can be utilized. In some examples, the data module 126 is operatively coupled to an interface module 172 configured to cause the database 110 to execute a database query according to the query input 128. The query input 128 can be in the database or global format, for example, and corresponds to the parameter(s) in at least one interactive list of filter statements 136. In some examples, the interface module 172 is operable to determine the tool(s) requesting the database query by comparing the query input 128 to the group of tool types 138. The interface module 172 can be operable to parse the query input 128 in the database or global format, and retrieve the query results from one or more database tables 174 based on the tool type(s) and other parameter(s) in the query input 128. In another example, the interface module 172 is operable to convert the query input 128 between a text string and binary numerical values, for example, prior to querying the database tables 174 in the database 110.

In some examples, the interface module 172 is operable to cause one or more database views 176 to be associated with the database tables 174 according to the tool types 138, filter types 140 and/or sub-filter types 142, which can be accessed during a particular database query. In some examples, the database 110 includes one or more database functions 178 each corresponding to different tool types 138, filter types 140 and/or sub-filter types 142 to retrieve the data in a desired way, utilizing the various database views 176 and/or database-specific function calls for the particular data being retrieved in the database tables 174.

In some examples, the filter package 120 includes an access module 167 configured to selectively permit or deny access to data in the database 110. The access module 167 is configured to permit or deny access to data in the database 110 in response to querying one or more access lists 168 to determine the role(s), permission(s), level(s), and/or type(s) of access a particular profile 170 has to the data, for example. The profile 170 can correspond to a physical user, such as a user operating one of the client computers 104, an instance of the environment 116, or a computing device such as one of the client computers 104.

In some examples, the query module 134 and/or the middleware 166 includes at least some of the functionality of the access module 167, or otherwise causes the access module 167 to execute. For example, the middleware 166 can be configured to restrict communication of particular field(s) in the database tables 174 to the display module 130 based on various server-side business rules and security guidelines, for example. In another example, the display module 130 is configured to restrict access to various data in the database 110.

Figure 4:
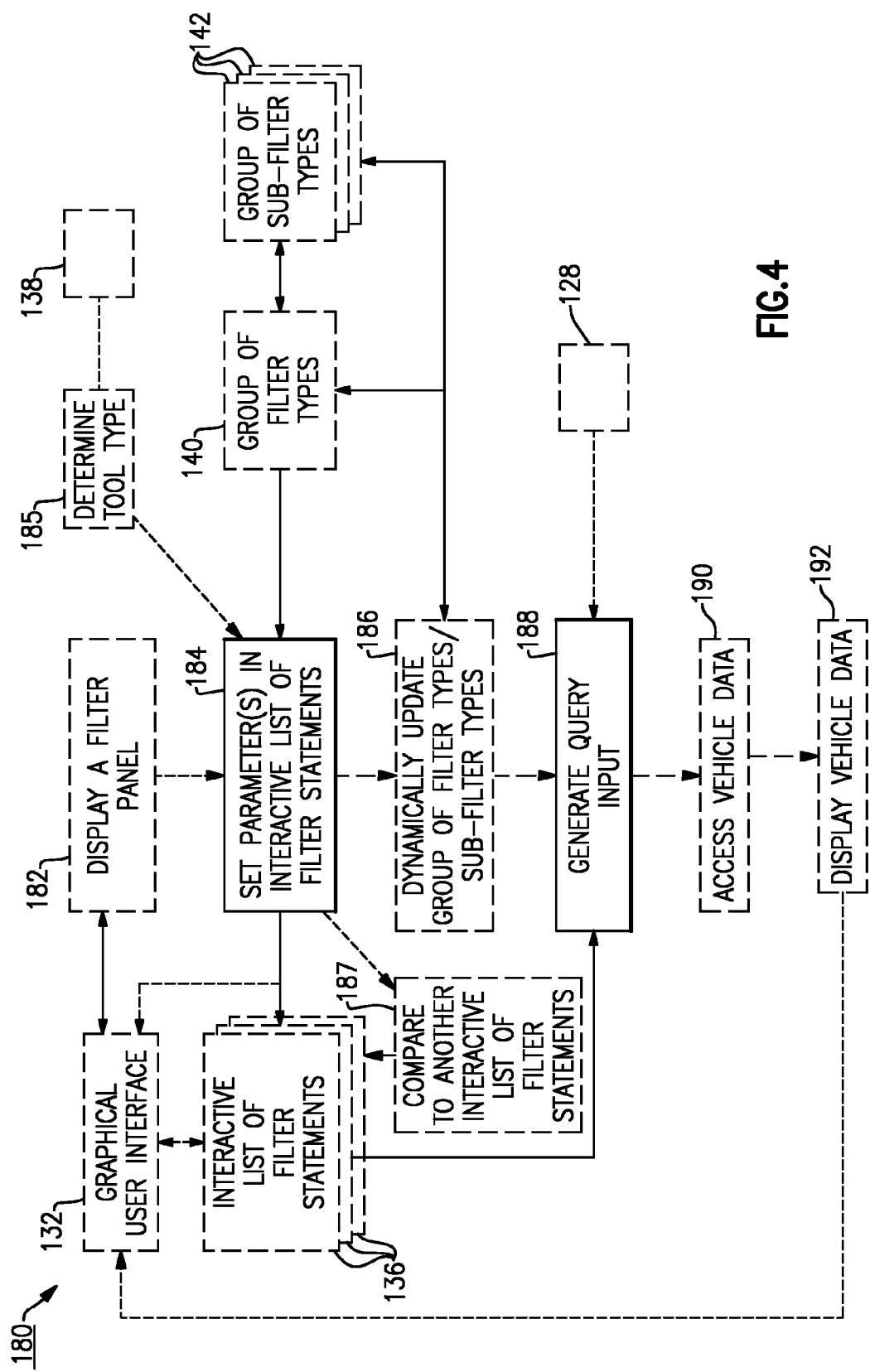
FIG. 4 illustrates an algorithm for filtering data in an environment.

FIG. 4 illustrates a filtering algorithm in a flowchart 180 for filtering data, such as HUMS data, utilizing any of the techniques discussed herein and the filter package 120 of FIG. 1B and/or any of FIGS. 2A to 2L. In some examples, at block 182 the algorithm 180 causes a filter panel to display in a GUI 132. At block 184 one or more parameters are set according to an interactive list of filter statements 136. The parameters may be set in a group of filter types 140 and/or a group of sub-filter types 142. In some examples, the parameters in the interactive list of filter statements 136 includes interacting with the GUI 132 to cause the interactive list of filter statements 136 to update.

In some examples, the algorithm 180 determines a tool type or utility based on a list of tool types 138 at block 185. In other examples, the algorithm 180 causes the interactive list of filter statements 136 to update according to one or more other interactive lists of filter statements 136 at block 187.

The algorithm 180 causes the group of filter types, sub-filter types, and/or filter options 140, 142, 144 to dynamically update at block 186. Accordingly, the group of filter types, sub-filter types and/or filter options 140, 142, 144 can be dynamically updated based on selections made or parameters set in the interactive list of filter statements 136, including any or all previous selections in the interactive list of filter statements 136.

At block 188, the algorithm 180 causes query input 128 to generate according to the one or more interactive list of filter statements 136. In some examples, the algorithm 180 causes one or more iterations of block 186 to occur prior to block 188. At block 190 the algorithm 180 causes the data to be accessed in a database or otherwise communicated according to the query input 128. In some examples, at block 192 data such as HUMS or vehicle data is displayed in the GUI 132 according to the interactive list of filter statements 136.

The algorithm 180 can be programmed in the HUMS software directly, provided as one or more software plug-ins adapted to work with the native HUMS software, or provided in a standalone program to interface with a filter package 120 to provide the desired solution. It should be understood that the host computer 102, client computer 104 or other computing device executing the environment 116 can be programmed with multiple additional tools, including various HUMS functionality, and the various features and tools included can be configured to interoperate with each other according to known principles.

Although the discussed examples illustrate a specific component, examples or embodiments of this disclosure are not limited to those particular combinations. One of skill in the art having the benefit of this disclosure will recognize that it is possible to use some of the components or features from one of the examples in combination with features or components from another one of the examples. Furthermore, various embodiments may include one or more examples within them, while other embodiments may include a different subset of examples. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for filtering data, comprising:
   a computing device including a processor and a memory storage device, the processor being configured to execute a query module operatively coupled to a data module and to a display module;
   wherein the data module is configured to access vehicle data in a database according to a query input;
   wherein the display module is operatively coupled to the data module and is configured to display the vehicle data in a graphical user interface; and
   wherein the query module is operatively coupled to the data module and to the display module, and the query module is configured to generate the query input according to an interactive list of filter statements, each filter statement in the interactive list of filter statements being selectable from a group of filter types, the group of filter types being configured to dynamically update in response to at least one selection from the group of filter types.

2. The system as recited in claim 1, wherein the group of filter types includes an aircraft model type, an operation cycle type, and an avionics parameter name.

3. The system as recited in claim 2, wherein each filter statement in the interactive list of filter statements is selectable from a group of sub-filter types, and the group of sub-filter types is configured to dynamically update in response to at least one selection from the group of filter types.

4. The system as recited in claim 3, wherein each sub-filter of the group of sub-filter types is linked to a list of filter options, the list of filter options being configured to dynamically update in response to selections from the group of filter types and the group of sub-filter types.

5. The system as recited in claim 4, wherein the query module is configured to cause the list of filter options to dynamically update according to vehicle data present in the database.

6. The system as recited in claim 1, wherein the graphical user interface is operable to cause the interactive list of filter statements to update in response to a user interaction.

7. The system as recited in claim 6, wherein the query module is configured to update a filter settings object, the filter settings object is linked to the graphical user interface, and the filter settings object is configured to store the interactive list of filter statements.

8. The system as recited in claim 7, wherein the query module is configured to generate the query input according to the filter settings object, and is configured to cause the display module to display the vehicle data according to the filter settings object.

9. The system as recited in claim 6, wherein the graphical user interface includes a query input field operable to cause a representation of the interactive list of filter statements in the graphical user interface to update according to the query input field.

10. The system as recited in claim 1, wherein the display module is operable to display the vehicle data in a graphical user interface according to the interactive list of filter statements.

11. The system as recited in claim 1, wherein the interactive list of filter statements corresponds to a first software utility executable by the computing device, the interactive list of filter statements is generated according to a second interactive list of filter statements, the second interactive list of filter statements corresponds to a second utility executable by the computing device, and the second interactive list of filter statements corresponds to a second, different group of filter types.

12. A system for filtering health and usage management system (HUMS) data, comprising:
    a database configured to store vehicle data communicated from at least one control station;
    at least one client computing device including a processor and a memory storage device, the processor being configured to execute a query module operatively coupled to a data module and to a display module; and
    wherein the data module is configured to access the vehicle data in the database according to a query input, the display module is configured to display the vehicle data a graphical user interface, and the query module is configured to generate the query input according to an interactive list of filter statements, each filter statement in the interactive list of filter statements being selectable from a group of filter types, a group of sub-filter types relating to the group of filter types, and a list of filter options relating to the group of filter types, and at least one of the group of filter types, the group of sub-filter types, and the list of filter options being configured to dynamically update in response to at least one selection in the interactive list of filter statements.

13. The system as recited in claim 12, wherein the graphical user interface is configured to cause the interactive list of filter statements to update in response to a user interaction.

14. The system as recited in claim 12, wherein each filter type of the group of filter types is linked to the group of sub-filter types and the list of filter options, the group of sub-filter types being configured to dynamically update in response to selection of the respective filter type, and the list of filter options being configured to dynamically update in response to selection of the respective filter type.

15. The system as recited in claim 14, wherein the database is configured to cause the list of filter options to dynamically update according to vehicle data present in the database.

16. A method for filtering health and usage management system (HUMS) data, comprising:
providing a computing device including a processor and a memory storage device, the processor being operable to generate a graphical user interface;
setting one or more parameters in an interactive list of filter statements, each filter statement in the interactive list of filter statements selectable from a group of filter types;
dynamically updating the group of filter types in response to at least one previous selection from the group of filter types;
generating a query input according to the interactive list of filter statements;
accessing vehicle data in a database according to the query input; and
wherein the computing device is operable to cause the steps of setting, dynamically updating, generating and accessing to occur in response to interacting with the graphical user interface.

17. The method as recited in claim 16, wherein the step of generating a query input according to the interactive list of filter statements occurs after the step of dynamically updating the group of filter types in response to at least one previous selection from the group of filter types.

18. The method as recited in claim 16, wherein the step of setting one or more parameters in the interactive list of filter statements includes interacting with the graphical user interface to cause the interactive list of filter statements to update.

19. The method as recited in claim 18, comprising displaying a filter panel in the graphical user interface according to the interactive list of filter statements.

20. The method as recited in claim 18, comprising displaying the vehicle data in the graphical user interface according to the interactive list of filter statements.

21. The method as recited in claim 18, wherein each filter statement in the interactive list of filter statements is selectable from a group of sub-filter types, and the group of sub-filter types is configured to dynamically update in response to at least one selection from the group of filter types.

22. The method as recited in claim 21, wherein each sub-filter of the group of sub-filter types is linked to a list of filter options, the list of filter options being configured to dynamically update in response to selections from the group of filter types and the group of sub-filter types.

23. The method as recited in claim 22, wherein the database is configured to cause the list of filter options to dynamically update according to vehicle data present in the database.

* * * * *